Oct. 11, 1932.                    O. J. GROEHN                    1,881,518
                            METHOD OF MAKING HINGES
                    Filed Feb. 1, 1929            5 Sheets-Sheet 1
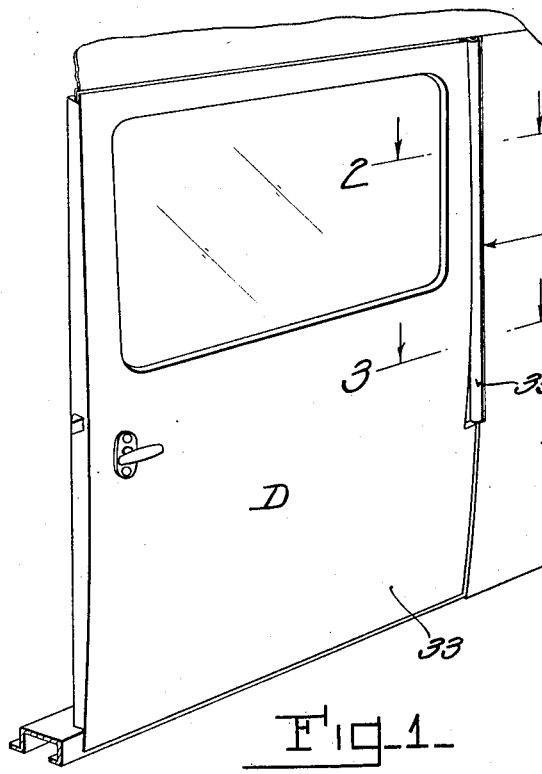
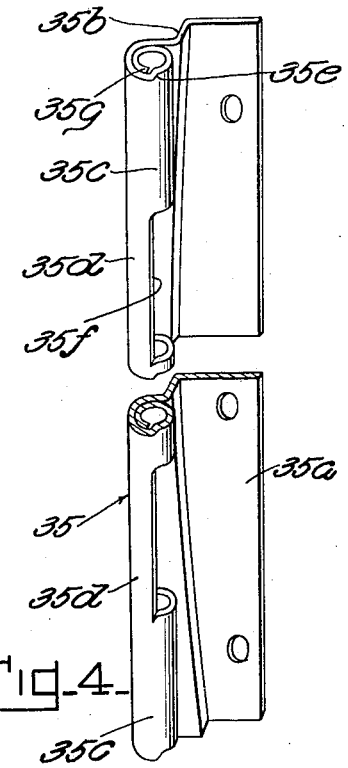
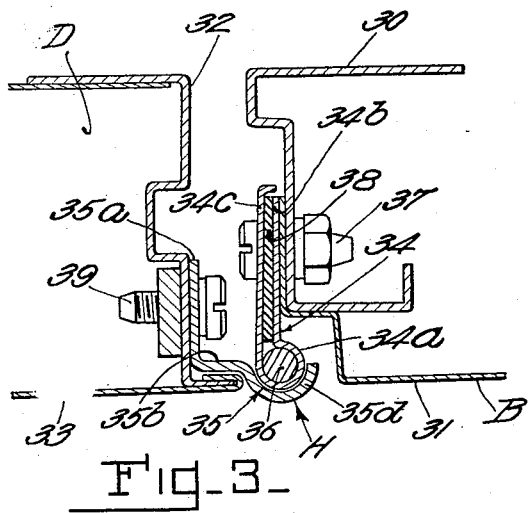
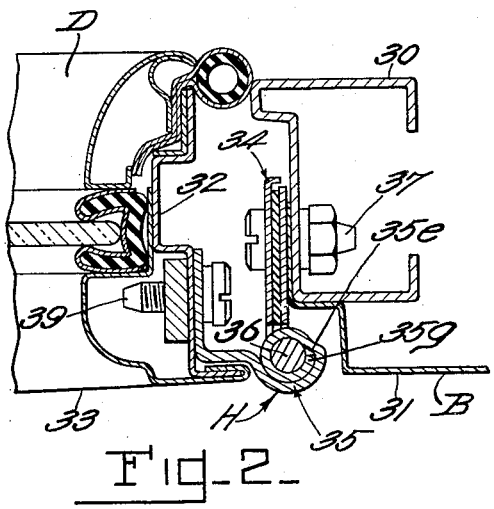
INVENTOR:
Otto J. Groehn
by Macleod, Calver, Copeland & Dike
Attys.

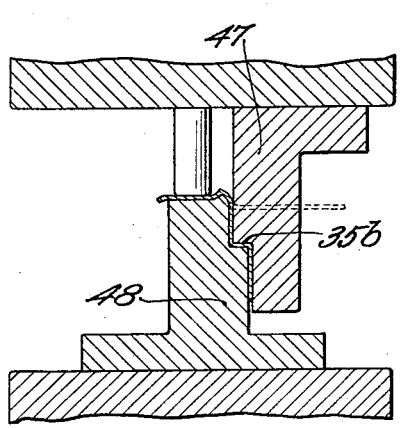
Fig. 7
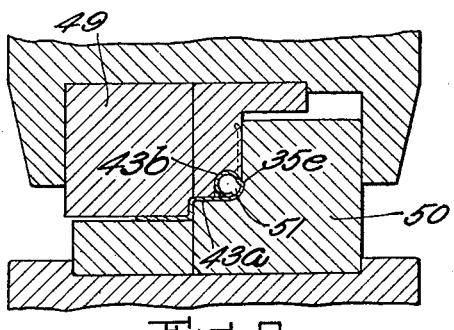
Fig. 8
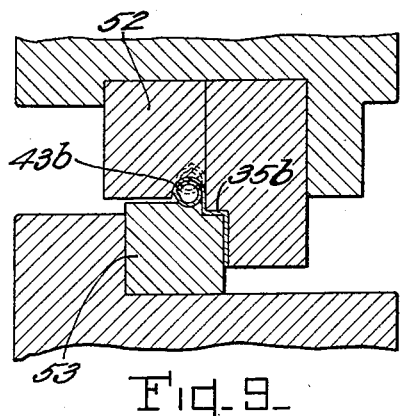
Fig. 9
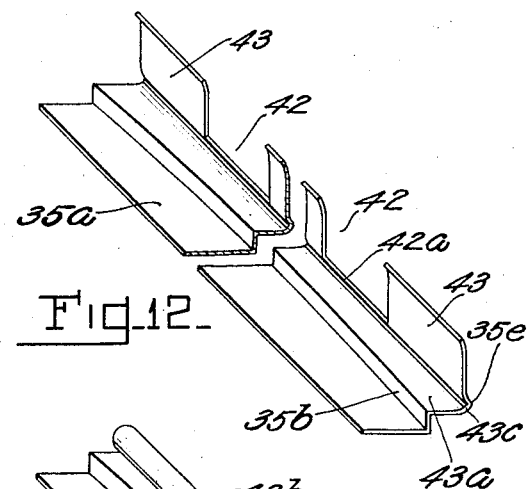
Fig. 12
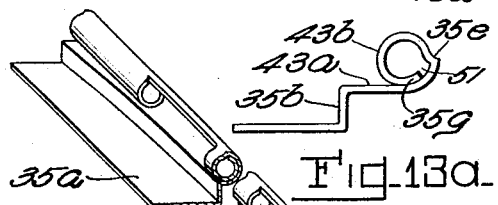
Fig. 13
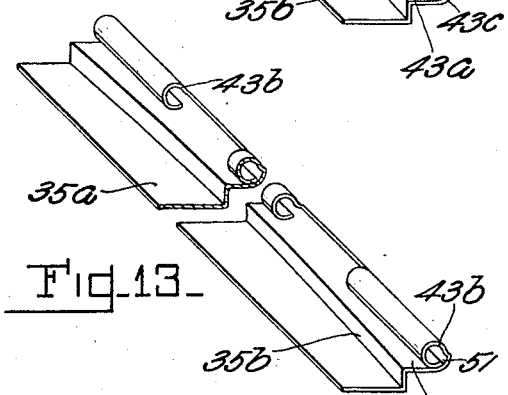
Fig. 13a
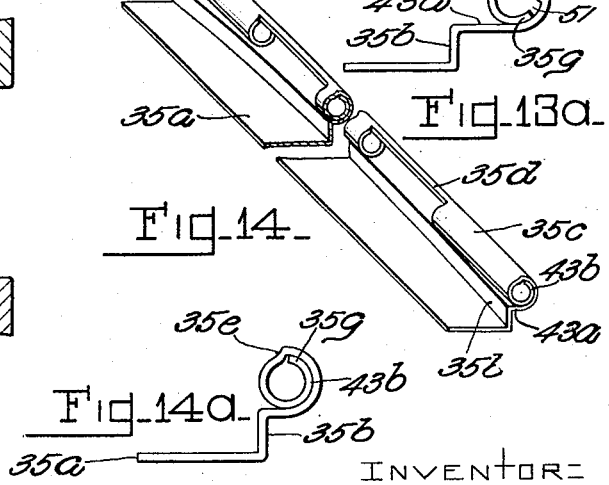
Fig. 14
Fig. 14a Oct. 11, 1932.  O. J. GROEHN  1,881,518
METHOD OF MAKING HINGES
Filed Feb. 1, 1929   5 Sheets-Sheet 4

INVENTOR:
Otto J. Groehn
by Macleod, Calver, Copeland & Dike
Attys.

Patented Oct. 11, 1932

1,881,518

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

METHOD OF MAKING HINGES

Application filed February 1, 1929. Serial No. 336,725.

This invention relates to a method for making hinges, and more particularly piano hinges utilized for hanging the doors of automobile bodies.

One of the important purposes of my invention is to provide an improved method whereby piano hinges may be cheaply and efficiently produced on a large scale for practical use in hanging automobile body doors, and preferably in which the knuckle joints of one of the hinge members will be partially, or to a large extent, enclosed or concealed by cover portions formed on the other hinge member.

The invention furthermore provides a method whereby a piano hinge may be made for hanging convex shaped automobile doors, wherein the knuckle parts of the hinge members will form a straight vertical bearing for the pintle pin to cause the door to swing on a vertical axis, whereas one of the hinge members, such as the female member, which is attached to the door may be secured in place on a curved line conforming to the curvature or convexity of the door.

The invention also has the further important advantage of enabling a covered joint piano hinge to be formed in a series of die operations, while producing hinge members having the pintle pin bearings properly and accurately positioned with respect to one another and all having a common central axis longitudinally of the hinge. One of the purposes of the method is to form the blank with projecting fingers, thereafter form the pintle pin bearings from these fingers, and then form the cover portions. This sequence of steps is of considerable commercial importance in speeding up and cheapening production.

Moreover, in the preferred embodiment of the invention, after the blank has been formed with projecting fingers, these fingers are coiled by a die operation to produce partly complete knuckle bearings, and then in a succeeding operation these bearing portions are rolled by a die operation upon themselves into spiral form, which operation also completes the formation of the knuckle bearings and the cover portions.

Considerable difficulty has been experienced in the manufacture, for large scale production, of satisfactory piano hinges for automobile doors. A serious problem has been found in the fact that each hinge member extends a substantial distance in the height of the door, and is provided with usually multiple pintle pin bearings such as six, which must be accurately formed and alined in order to receive the long pintle pin and permit the door to swing freely and easily. Moreover, it is desirable that the female hinge member be formed so as to cover or conceal the bearing portions of the male hinge member, and in addition the hinge members on account of present day body styles must be formed so that they can be attached snugly to a convex door and body. Many difficulties have therefore been encountered in producing such hinges in a practical manner, and hence by devising the present method whereby this can be accomplished preferably in a series of die or stamping operations, very important advantages and economies result.

Other objects of this invention will appear in the following description and appended claims reference being had to the accompanying drawings forming a part of this specification wherein like characters designate corresponding parts in the several views.

Fig. 1 is a fragmentary perspective view of a portion of an automobile body illustrating a door hinged by a piano hinge formed in accordance with the present invention.

Fig. 2 is a fragmentary sectional view taken substantially on line 2—2 of Fig. 1 in the direction of the arrows.

Fig. 3 is a fragmentary sectional view taken substantially on line 3—3 of Fig. 1.

Fig. 4 is a fragmentary perspective view of the female member of a piano hinge formed in accordance with the invention.

Figs. 5, 6, 7, 8 and 9 are fragmentary sectional views illustrating a series of dies for carrying out successive steps, or a series of steps, in the manufacture of one of the piano hinge members in accordance with one embodiment of the invention.

Figs. 10, 11, 12, 13 and 14 are fragmentary perspective views showing respectively the condition of the blank resulting from the operations shown in Figs. 5 to 9 inclusive.

Fig. 13a is an end view of the construction shown in Fig. 13.

Fig. 14a is an end view of the construction shown in Fig. 14.

Figure 5:
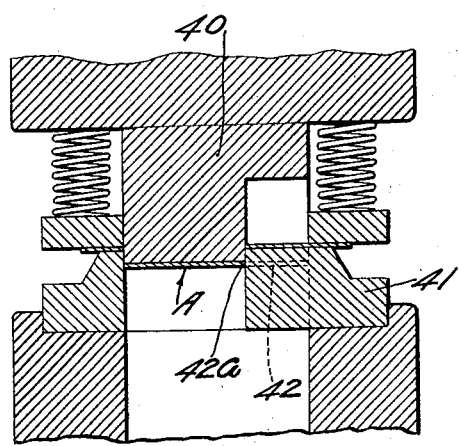

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention claimed herein beyond the requirements of the prior art.

Referring first to Figs. 1 to 4 inclusive, the present invention provides an apparatus and method for manufacturing a piano hinge H constructed for the purpose of hanging an automobile door D to the body portion B of the car. As illustrated the body may comprise an upright body pillar 30 and an outer panel 31, and the door comprises an adjacent door pillar 32 carrying an outer panel 33. The panels 31 and 33 are somewhat convex in shape in accordance with the curved lines of the body. The piano hinge H extends continuously the major part of the height of the door, and comprises a male hinge member 34 which is secured as by means of bolts 37 to the body pillar 30. The hinge H also comprises a female hinge member 35 which is secured as by means of bolts 39 to the door pillar 32. These hinge members 34 and 35 are connected together by means of a straight vertical pintle pin 36. Although the outer panels 31 and 33 of the body and door are convex or outwardly curved in shape, the piano hinge member H is so constructed as to permit attachment of the hinge members to the curved door and body pillar permitting the door to swing on a straight vertical axis.

The apparatus illustrated in the drawings is designed for the purpose of producing the hinge member 35 of the piano hinge which is preferably attached to the door. This hinge member is shown particularly in Fig. 4 wherein it comprises a body portion 35a having a series of holes permitting attachment to the pillar 32 by means of the bolts 39. This hinge member is formed with a flange or shoulder portion 35b which is stamped on a curve to conform to the curvature of the body, this shoulder portion being curved in the plane of the body portion 35a of the hinge member. The hinge member 35 also comprises a series of pintle pin bearings 35c each comprising a spiral formation having a longitudinal offset 35e, the free edge 35g of the metal terminating opposite this offset. The depth of the offset is approximately equal to the thickness of the metal so as to produce a substantially circular or cylindrical bearing, as shown in Fig. 2. The hinge member is of the covered joint type having cover portions 35d intermediate the bearings 35c, these cover portions being designed for the purpose of covering or concealing the pintle pin bearings 34a of the hinge member 34 as shown in Fig. 3. The hinge is made so that the longitudinal free edge 35f of each of the cover portions preferably extends substantially in alinement with the offset 35e. When so constructed the end edge 35g of the spirally formed convolution of the bearing terminates substantially on a line with the edge 35f of the cover portion. From the foregoing it will be seen that the hinge member 35 is formed with an attaching portion 35a, 35b whereby it may be snugly secured to the curved door while permitting the door to swing on a vertical axis. It is also provided with cylindrical knuckle bearings by virtue of the offsets 35e, and is also provided with cover portions 35d which conceal the knuckle bearings 34a of the other hinge member.

The hinge member 34 is preferably formed in a series of stamping operations from a flat blank which is stamped out or punched centrally to provide an aline series of slots or openings. The blank is then stamped to form intermediate its ends the spaced cylindrical pintle pin bearings 34a, the projecting sides 34b and 34c being folded together into spaced parallel relation for attachment by bolts 37 to the body pillar 30. A metallic reenforcing strip 38 is interposed between the sides 34b and 34c of the hinge member to stiffen it, this hinge member being formed of thinner gauge steel than the hinge member 35. This permits the pintle pin bearings 34a to have a slight clearance within the cover portions 35d so as to turn readily and freely after the metallic surfaces have been lacquered or painted.

Figure 10:
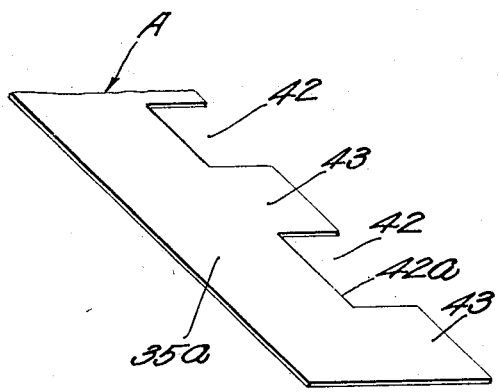
Figure 6:
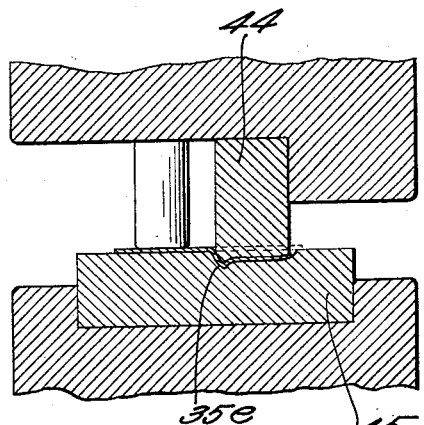
Figure 11:
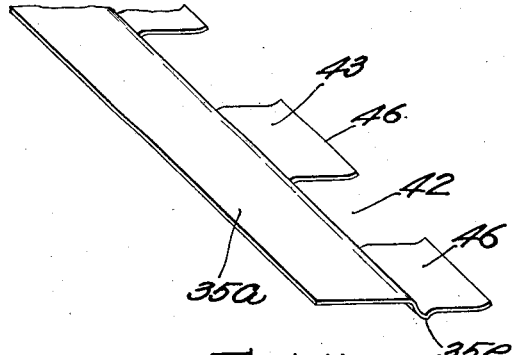

In Figs. 5 to 14 inclusive, I have illustrated a method of making the covered joint piano hinge member shown in Fig. 4, and an apparatus for carrying out the method. Referring to Figs. 5 and 10, a metal sheet, preferably of steel, is introduced between upper and lower die members 40 and 41 which cooperate to stamp out the sheet and form a blank A of proper shape. In this operation the blank is formed with an alternate series of slots 42 and projecting fingers 43. Referring to Fig. 6 the blank may be introduced into a press having die members 44 and 45 and stamped to form a longitudinal offset 35e substantially on a line with the base of the slots 42. These dies also form the ends of the fingers 43 each with an initial curve or partial curl 46 to facilitate coiling of the fingers in another operation. The blank at this stage is illustrated in Fig. 11.

Referring to Figs. 7 and 12 the blank may now be operated upon by die members 47 and 48 of a suitable press. In this stamping operation the body portion 35a is bent at right angles to the projecting fingers 43, and this body portion is also stamped to provide a longitudinal curved or convex shoulder 35b. The body portion is thus stepped in formation and divided by means of the curved flange or shoulder 35b into the portions 43a and 35a as shown in Fig. 12. The portion 43a extends at right angles to the fingers 43 and is substantially narrower at its middle than at opposite ends by virtue of the curvature of the shoulder 35b.

Referring to Figs. 8, 13 and 13a the blank may be introduced into a press having dies 49 and 50 which operate to form the initial coils 43b in the projecting fingers 43. It will be noted that the upper die 49 operates in the plane of the fingers 43 to form the coils, and at right angles to the plane of the portion 43a of the body. In this step of the method the die 49 curls the ends of the fingers downwardly and inwardly so as to lie against the metal 43a with the free ends 35g of the fingers spaced substantially from the offsets 35e as shown at 51, but wholly enclosed or covered by the body portion 43a. It will thus be seen that in this step the convolution is not fully formed, so that the final shape has not been given to the pintle pin bearings at this stage.

Referring now to Figs. 9, 14 and 14a the blank may then be introduced into a press having dies 52 and 53. The upper die 52 in this instance operates vertically in the direction of the plane of the body portion 43a. The dies are so formed and operated as to complete the convolutions 43b, or in other words to complete the coiling of the fingers and bring the ends thereof substantially opposite the offsets 35e, preferably into substantially abutting relation, and forming substantially true cylindrical bearings. The offsets 35e have a depth substantially equivalent to the thickness of the metal, as a result of which the inner bearing faces will be substantially circular. The dies 52 and 53 also cooperate to roll the convolutions 43b upon themselves toward the curved shoulder 35b so that the completed pintle pin bearings 35c will be spiral in formation, comprising more than a single convolution, and causing the body portion 43a to be rolled up to form the arcuate cover portions 35d.

Figure 15:
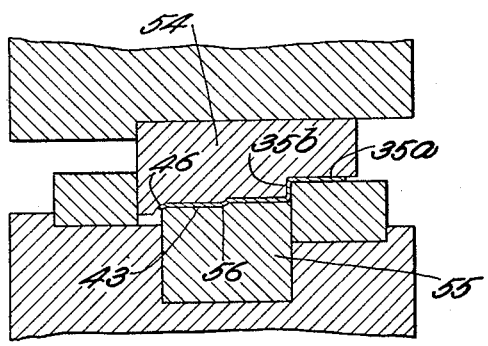
Figs. 15, 16 and 17 illustrate modified forms of dies for carrying out steps alternative to certain of the steps shown in Figs. 5 to 9 inclusive.
Figure 16:
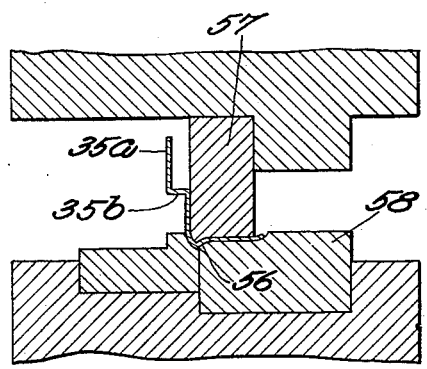

It will be understood that in Figs. 5 to 14 inclusive, I have simply illustrated and described the main steps of operations in the manufacture of the hinge member in accordance with this embodiment of the invention. In actual practice other operations, such as punching the bolt holes, are performed on the blank during the course of production of the hinge which it is not deemed necessary to describe herein. Moreover, the exact sequence of certain of the steps, or the performance of all of the described steps, or in the manner shown is not essential; and the invention therefore is not intended to be thus limited. I may substitute for the cooperating dies illustrated in Figs. 6 and 7, the dies shown in Figs. 15 and 16. Referring first to Fig. 15, the slotted blank A of Fig. 10, after coming from the dies 40 and 41, may be introduced between the die members 54 and 55 (Fig. 15). These are operated to form the curved shoulder or flange portion 35b longitudinally of the blank and also to form, parallel to the shoulder 35b, an offset 56 equal to the thickness of the metal. The free edges of the fingers 43 are also curved downwardly at 46 by the dies. The blank is then introduced between the die members 57 and 58 (Fig. 16), which operate on the blank and produce a right-angled bend along the line of the offset 56, the resulting article being the same as shown in Fig. 12. From the foregoing it will be seen that the steps illustrated in Figs. 15 and 16 may be substituted for those shown in Figs. 6 and 7.

Figure 17:
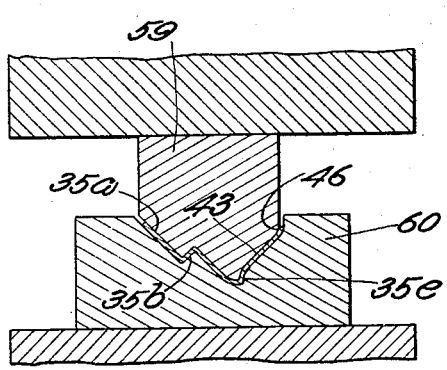
Figure 18:
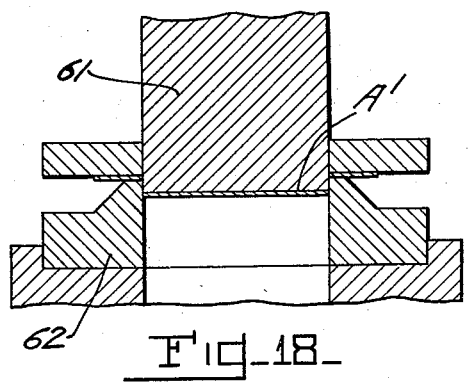
Figure 22:
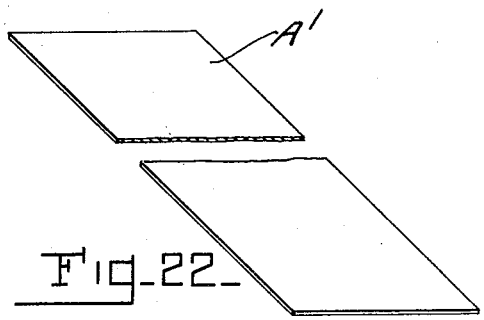
Figure 19:
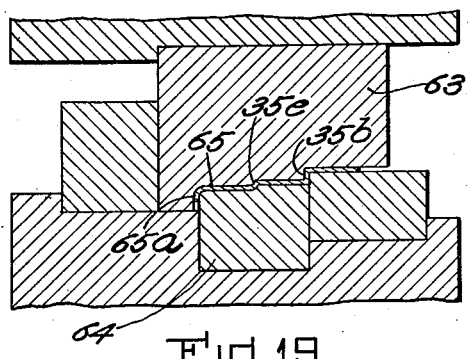
Figure 23:
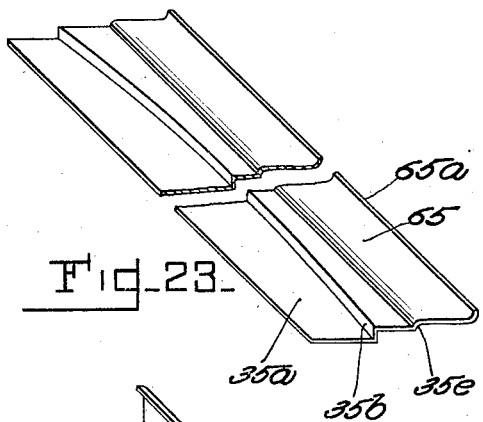
Figure 20:
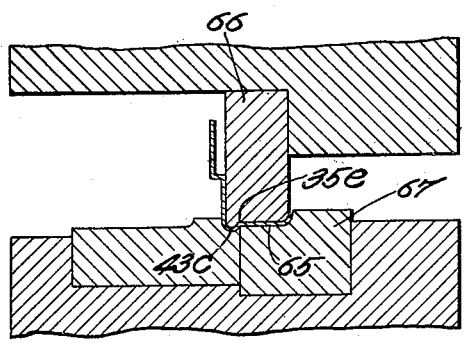

Furthermore, the steps of Figs. 6 and 7, or Figs. 15 and 16, may if desired be carried out in a single operation as shown in Fig. 17 such as by means of a pair of dies 59 and 60. Accordingly, the slotted blank A, shown in Fig. 10, after coming from the dies 40 and 41 may be introduced between dies 59 and 60 which operate to form simultaneously the offset 35e, the right-angle bend along the line of this offset, the curved shoulder 35b, and the curves 46 in the free edges of the fingers 43. The blank thus formed in the dies 59 and 60 is the same as illustrated in Fig. 12.

It will be noted that in forming the blank shown in Fig. 12 that a longitudinal groove 43c is formed the full length of the blank parallel to and below the longitudinal offset 35e. By stamping this groove the free edges 42a at the base of the several slots 42 are thereby curved inwardly producing what may be called an initial or partial coil. This enables the die 52 to descend, engage the initially curled edges 42a and complete the rolling of the cover portions. The accurate rolling of the knuckle portions 43b into spiral formation as shown in Figs. 14 and 14a is facilitated by virtue of this groove at the base of the offsets 35e which starts the spirals.

Referring to Figs. 18 to 25 inclusive, illustrating another embodiment of the invention, the steps of the method may be carried out in somewhat different sequence from that described above. The metal sheet may first be introduced between a pair of dies 61 and 62 which are operated to stamp out into the desired shape a suitable blank A', see Fig. 22. This blank may then be introduced into a press having upper and lower die members 63 and 64. These die members are constructed to stamp the blank A' into the form shown in Fig. 23 producing in the blank a longitudinal curved shoulder or flange portion 35b adapted to conform substantially to the convex shape or curvature of the body of the automobile. In this operation the blank is also formed with a straight longitudinal offset 35e and with a curled or partially coiled edge 65a which forms the free marginal edge of the finger-forming portion 65 of the blank.

Figure 24:
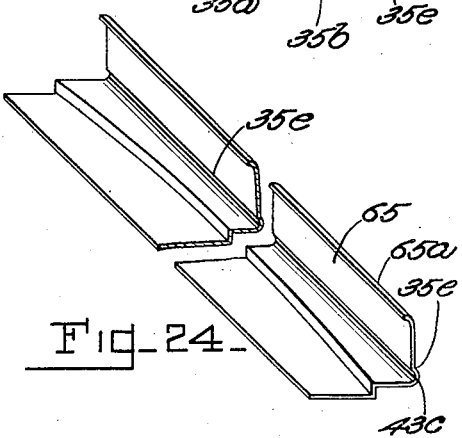

In a succeeding step the blank thus formed may be introduced into a press having upper and lower die members 66 and 67. These operate upon the blank in the manner shown in Fig. 20 to produce a right-angled bend parallel to the offset 35e. In forming this bend the blank is stamped to produce a longitudinal groove 43c which lies beneath or at the base of the offset 35e as shown in Fig. 24, this latter figure illustrating the blank after it has been worked in the manner shown in Fig. 20.

Figure 21:
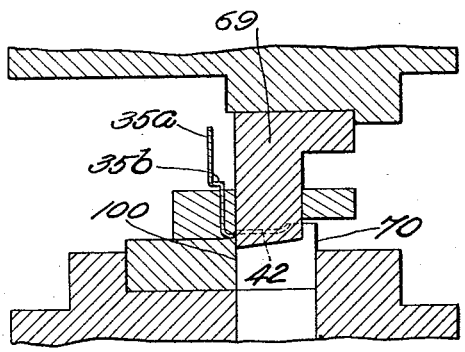
Figs. 18, 19, 20 and 21 are fragmentary sectional views illustrating a series of dies for carrying out a series of steps in the manufacture of one of the piano hinge members, in accordance with another embodiment of the invention.
Figure 25:
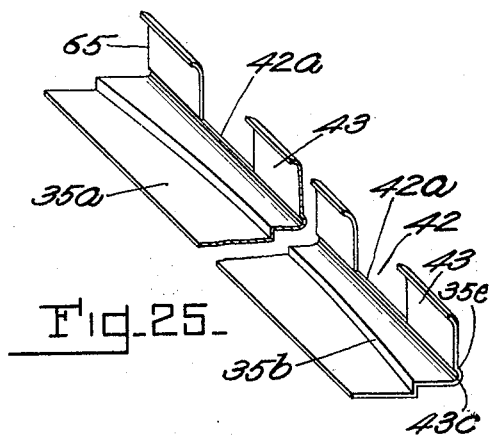
Figs. 22, 23, 24 and 25 are fragmentary perspective views showing respectively the condition of the blank resulting from the operations shown in Figs. 18 to 21 inclusive.

The blank thus formed may be introduced into a press having upper and lower die members 69 and 70, as shown in Fig. 21, which operate to stamp or punch out a series of slots 42 in the finger-forming portion 65 of the blank thereby producing a series of fingers 43 as shown in Fig. 25. The slots 42 are preferably punched so that the base 42a of each slot will extend substantially on a line with the vertical offset 35e, this being indicated by the vertical line 100 in Fig. 21. Referring to Fig. 25, which illustrates the blank after it has been worked upon by the apparatus of Fig. 21, it will be seen that the bottom edges 42a at the base of the several slots 42 (which ultimately form the free edges of the cover portions of the hinge member) are curved or partially curled inwardly in accordance with the curvature of the groove 43c. Furthermore, the ends of the fingers 43 are also partially curled inwardly. By forming the blank in this manner, as explained above, the blank may be readily worked upon, first to coil the fingers 43 into the pintle pin bearings and then to roll or coil the bottom edges of the slots into the cover portions 35d. When the die 49 descends vertically it engages the curved ends of the fingers 43 and readily coils them in the manner shown in Fig. 8. When the blank thus formed is operated upon by the die members 52 and 53, the die 52 when descending vertically engages the curved edges 42a thereby enabling the cover portions 35d to be formed.

From the foregoing it will be seen that I have produced a practicable and efficient method for producing a piano hinge member adapted to be used for hinging doors of automobile bodies. The dies which may be used for accomplishing the several steps of the method have been shown for illustrative purposes. It will be understood that each pair of upper and lower cooperating dies referred to above preferably comprises a stationary lower die and a vertically reciprocating upper die, suitable mechanism being provided for reciprocating the upper die.

I claim:

1. The method of making a piano hinge member for an automobile door, comprising forming at one side of a blank a series of projecting fingers separated by slots, partially curling the free edges of the fingers and the bottom edges of the slots, applying pressure in one direction to further curl the fingers into pintle pin bearings, and applying pressure in a direction at right angles to the direction of the first pressure applied to curl said bottom edges to form cover portions.

2. The method of making a piano hinge member for an automobile door, comprising stamping a blank to form a longitudinal flange bent on an arc and to form a series of fingers all lying in one plane, forming a longitudinal offset substantially the thickness of the metal at the base of each finger, rolling the fingers to bring the free edges into abutting relation with said offsets to form pintle pin bearings, and then rolling said bearings and the metal between the bearings toward said flange to form cover portions between the bearings.

3. The method of making a piano hinge member for an automobile door, comprising forming in the length of a blank fingers or projections and longitudinally alined offsets at the base of the projections, simultaneously coiling the fingers to form convolutions having a common longitudinal axis and to bring the ends of the fingers opposite said offsets, and then rolling said coiled portions and metal therebetween to form cover portions.

4. The method of making a piano hinge member for an automobile door, comprising forming a blank with projecting fingers and a body portion lying in a plane substantially at right angles to the plane of the fingers, applying pressure to the fingers in the direction of their plane to coil the fingers and enclose the ends thereof within the body portion, and then applying pressure to the edge of the body portion to roll the body around said coiled finger portions.

5. The method of making a piano hinge member for an automobile door, comprising forming a blank with projecting fingers, coiling the fingers to produce partially complete knuckle bearings with substantially circular openings for a pintle pin, and thereafter rolling the bearings and the metal therebetween to produce cover portions between the bearings and to complete the formation of the bearings.

6. The method of making a piano hinge member for an automobile door, comprising forming a blank with a projecting finger and a body portion lying in a plane at right angles to the plane of the finger, coiling the finger in the direction of its plane to form a convolution, and then rolling the convolution in a direction in the plane of the body portion and at right angles to the direction of the coiling.

7. A method of making a hinge member for an automobile door or the like, comprising the steps of stamping a sheet metal blank to provide knuckle forming portions, fashioning said portions into pintle pin bearing members, and rolling said members upon the body of the blank to form cover portions; the bearing faces of said members being made substantially circular in form by offsetting, at one stage of the method, the metal forming said members in line with the edges of the cover portions.

In testimony whereof I affix my signature.

OTTO J. GROEHN.